(12) United States Patent
Cushing et al.

(10) Patent No.: US 10,227,969 B1
(45) Date of Patent: *Mar. 12, 2019

(54) METHODS AND APPARATUS FOR CONTROL OF OIL WELL PUMP

(71) Applicant: CUSHING PUMP REGULATOR, LLC, Danville, KY (US)

(72) Inventors: Darrell Dana Cushing, Danville, KY (US); Kenn Nelson, Danville, KY (US); Steve Fowler; Troy Edwards, Danville, KY (US); Jason Carabetta, Pittston, PA (US)

(73) Assignee: CUSHING PUMP REGULATOR, LLC, Danville, KY (US)

( * ) Notice: Subject to any disclaimer, the term of this patent is extended or adjusted under 35 U.S.C. 154(b) by 710 days.

This patent is subject to a terminal disclaimer.

(21) Appl. No.: 14/486,791

(22) Filed: Sep. 15, 2014

Related U.S. Application Data

(63) Continuation-in-part of application No. 13/289,723, filed on Nov. 4, 2011, now Pat. No. 9,097,247.

(60) Provisional application No. 61/456,315, filed on Nov. 5, 2010.

(51) Int. Cl.
| | |
|---|---|
| *F04B 47/00* | (2006.01) |
| *F04B 49/06* | (2006.01) |
| *F04B 49/22* | (2006.01) |
| *E21B 43/12* | (2006.01) |
| *G05D 7/06* | (2006.01) |

(52) U.S. Cl.
CPC ......... *F04B 49/065* (2013.01); *E21B 43/121* (2013.01); *F04B 47/00* (2013.01); *F04B 49/225* (2013.01); *G05D 7/0617* (2013.01)

(58) Field of Classification Search
CPC .......... F04B 47/00; F04B 47/02; F04B 47/06; F04B 49/065; E21B 43/126; E21B 43/128
See application file for complete search history.

(56) References Cited

U.S. PATENT DOCUMENTS

| | | |
|---|---|---|
| 2,647,585 A | 8/1953 | Roberts |
| 3,854,846 A | 12/1974 | Douglas |
| 4,102,394 A | 7/1978 | Botts |
| 4,473,338 A * | 9/1984 | Garmong ............... E21B 43/128 307/141 |
| 5,006,044 A | 4/1991 | Walker, Sr. et al. |
| 5,063,775 A * | 11/1991 | Walker, Sr. ......... E21B 47/0008 73/152.31 |
| 5,222,867 A | 6/1993 | Walker, Sr. et al. |
| 5,244,350 A | 9/1993 | Yang |
| 5,525,040 A | 6/1996 | Andreae et al. |
| 5,819,848 A * | 10/1998 | Rasmuson .......... E21B 47/0007 166/250.15 |
| 5,904,126 A | 5/1999 | McKay et al. |
| 6,041,856 A | 3/2000 | Thrasher et al. |
| 6,368,068 B1 | 4/2002 | Corlew et al. |
| 6,434,435 B1 | 8/2002 | Tubel et al. |
| 6,817,419 B2 | 11/2004 | Reid |
| 7,117,120 B2 | 10/2006 | Beck et al. |

(Continued)

*Primary Examiner* — Essama Omgba
*Assistant Examiner* — Philip E Stimpert
(74) *Attorney, Agent, or Firm* — Middleton Reutlinger

(57) ABSTRACT

Methods and apparatus for automated control of a pump utilized to draw liquid from a fluid reservoir. Certain aspects relate to one or more components of an oil well pump control system. Other aspects relate to methods for automated control of a pump utilized to draw oil from an oil well.

12 Claims, 10 Drawing Sheets

(56) References Cited

U.S. PATENT DOCUMENTS

| | | |
|---|---|---|
| 7,168,924 B2 | 1/2007 | Beck et al. |
| 7,558,699 B2 | 7/2009 | Beck et al. |
| 7,634,328 B2 | 12/2009 | Medizade et al. |
| 7,668,694 B2 | 2/2010 | Anderson et al. |
| 7,762,339 B2 | 7/2010 | Bevan et al. |
| 7,869,978 B2 | 1/2011 | Anderson et al. |
| 2010/0111716 A1* | 5/2010 | Gibbs ............... F04B 49/065 417/63 |

* cited by examiner

METHODS AND APPARATUS FOR CONTROL OF OIL WELL PUMP

CROSS-REFERENCE TO RELATED DOCUMENTS

This Application is a continuation-in-part of currently pending application Ser. No. 13/289,723, filed Nov. 4, 2011 and entitled Methods and Apparatus for Control of Oil Well Pump, which claims the benefit of Provisional Application Ser. No. 61/456,315, filed Nov. 5, 2010 and entitled Cushing Pump Regulator (CPR). Both of the immediately aforementioned applications are hereby incorporated by reference in their entirety.

TECHNICAL FIELD

The present disclosure is directed generally to control of mechanical pumps utilized to transfer liquids from a fluid reservoir. More particularly, various methods and apparatus disclosed herein relate to automated control of a mechanical pump utilized to draw oil from an oil well.

BACKGROUND

Techniques for drilling and preparing an oil well for production are well known. Once prepared, some oil wells may have sufficient reservoir pressure to enable the natural flow of oil to the surface. However, most oil wells require the use of a downhole pump to mechanically lift the oil above ground. Several type of pumps are employed for this purpose including, for example, positive displacement reciprocating pumps, electrically operated downhole submersible pumps, rotary screw pumps, and/or gas or hydraulically operated plunger lift or jet velocity systems. A prime mover is utilized to actuate the pump, often via a pump-jack driving the pump. The prime mover is commonly an electric motor, but may optionally be a combustion engine. In many oil wells it may not be desirable to have the pump run continuously. For example, in some oil wells running the pump continuously may lead to intermittent dry pumping and/or inefficient pumping of oil.

SUMMARY

The present disclosure is directed to methods and apparatus for automated control of a pump utilized to draw liquid from a fluid reservoir. For example, various methods and apparatus disclosed herein relate to automated control of a mechanical pump utilized to draw oil from an oil well. Certain aspects relate to one or more components of a pump control system. Other aspects relate to methods for automated control of a mechanical pump.

Generally, in one aspect, a method of automated control of a pump utilized to draw oil from an oil well is provided. The method may include the steps of: selectively causing a pump to run for at least a watchdog time out period after an off cycle; monitoring an oil flow detector in an oil conduit fed by the pump and measuring an actual pump run time period while the pump is running; and continuing to run the pump beyond the watchdog time out period when the oil flow detector indicates oil is flowing in the conduit prior to the end of the watchdog time out period. When the pump runs beyond the watchdog time out period, the pump is allowed to run until at least one of the actual pump run time equals a maximum continuous pump run time or the oil flow detector indicates oil is no longer sufficiently flowing in the conduit. The method further includes the step of causing the pump to enter the off cycle when at least one of the actual pump run time period equals the maximum continuous pump run time or the oil flow detector indicates oil is no longer sufficiently flowing in the conduit.

In some embodiments the method further includes the step of entering the off cycle when the oil flow detector does not indicate oil is flowing in the conduit prior to the end of the watchdog time out period. In some versions of those embodiments the method further includes the step of increasing the duration of the off cycle when the oil flow detector does not indicate oil is flowing in the conduit prior to the end of the watchdog time out period.

In some embodiments the method further includes the step of monitoring the number of consecutive watch dog time out period the oil flow detector does not indicate oil is flowing in the conduit prior to the end of the watchdog time out period. In some versions of those embodiments the method further includes the step of shutting down automated control of the pump and requiring a manual restart when the number of consecutive times the oil flow detector does not indicate oil is sufficiently flowing in the conduit prior to the end of the watchdog time out period exceeds a preset maximum.

In some embodiments the method further includes the step of monitoring an air pressure of the conduit and shutting down the pump when the air pressure indicates one of a low pressure condition and a high pressure condition.

Generally, in another aspect, a method of automated control of a pump utilized to draw oil from an oil well may include the steps of: selectively causing a pump to run for at least a watchdog time out period after an off cycle; monitoring an oil flow detector in an oil conduit fed by the pump and measuring an actual pump run time period while the pump is running; entering the off cycle when the oil flow detector does not indicate oil is flowing in the conduit prior to the end of the watchdog time out period; and continuing to run the pump beyond the watchdog time out period when the oil flow detector indicates oil is flowing in the conduit prior to the end of the watchdog time out period. When the pump runs beyond the watchdog time out period, the pump is allowed to run until at least one of the actual pump run time equals a maximum continuous pump run time or the oil flow detector indicates oil is no longer sufficiently flowing in the conduit. The method further includes the step of causing the pump to enter the off cycle when the pump runs beyond the watchdog time out period and when either the actual pump run time period equals the maximum continuous pump run time or the oil flow detector indicates oil is no longer sufficiently flowing in the conduit.

In some embodiments the method further includes the step of monitoring the number of consecutive of the watchdog time out period the oil flow detector does not indicate oil is flowing in the conduit prior to the end of the watchdog time out period. In some versions of those embodiments the method further includes the step of shutting down automated control of the pump and requiring a manual restart if the number of consecutive times the oil flow detector does not indicate oil is sufficiently flowing in the conduit prior to the end of the watchdog time out period exceeds a preset maximum.

In some embodiments the pump is allowed to run for at least a pump run time when the pump runs beyond the watchdog time out period. In some versions of those embodiments the method further includes the step of decreasing a duration of the off cycle when the pump runs beyond the watchdog time out period, beyond the pump run time, and either the actual pump run time period equals the maximum continuous pump run time or the oil flow detector indicates oil is no longer sufficiently flowing in the conduit.

In some embodiments the method further includes the step of decreasing a duration of the off cycle when the pump runs beyond the watchdog time out period, beyond a pump run time, and either the actual pump run time period equals the maximum continuous pump run time or the oil flow detector indicates oil is no longer sufficiently flowing in the conduit.

In some embodiments the method further includes the step of increasing a duration of the off cycle when the oil flow detector does not indicate oil is flowing in the conduit prior to the end of the watchdog time out period.

In some embodiments the method further includes the step of monitoring an ambient temperature and shutting down the pump when the ambient temperature indicates a low temperature pump freeze condition.

Generally, in another aspect, a method of automated control of a pump utilized to draw oil from an oil well includes the steps of selectively causing a pump to run for at least a watchdog time out period after an off cycle; monitoring an oil flow detector in an oil conduit fed by the pump and measuring an actual pump run time period while the pump is running; increasing the duration of the off cycle and entering the off cycle when the oil flow detector does not indicate oil is flowing in the conduit prior to the end of the watchdog time out period; and continuing to run the pump beyond the watchdog time out period when the oil flow detector indicates oil is flowing in the conduit prior to the end of the watchdog time out period. When the pump runs beyond the watchdog time out period, the pump is allowed to run for until at least the actual pump run time equals a maximum continuous pump run time or the oil flow detector indicates oil is no longer sufficiently flowing in the conduit. The method may further include the steps of causing the pump to enter the off cycle when the pump runs beyond the watchdog time out period and when either the actual pump run time period equals the maximum continuous pump run time or the oil flow detector indicates oil is no longer sufficiently flowing in the conduit; and decreasing the duration of the off cycle when the pump runs beyond the watchdog time out period, beyond a user set pump run time, and either the actual pump run time period equals the maximum continuous pump run time or the oil flow detector indicates oil is no longer sufficiently flowing in the conduit.

In some embodiments the method further includes the step of monitoring the number of consecutive of the watchdog time out period the oil flow detector does not indicate oil is flowing in the conduit prior to the end of the watchdog time out period. In some versions of those embodiments the method further includes the step of shutting down automated control of the pump and requiring a manual restart if the number of consecutive times the oil flow detector does not indicate oil is sufficiently flowing in the conduit prior to the end of the watchdog time out period exceeds a preset maximum.

In some embodiments the duration of the off cycle is kept constant when the pump is allowed to run for at least the watchdog timeout period and no more than the pump run time.

Generally, in another aspect, a pump control system for automated control of a pump utilized to draw oil from an oil well is provided. The pump control system includes a check valve having a check valve throughway and a barrier pivotally arranged in the check valve throughway. The barrier pivots to a closed position blocking the check valve through- way when a sufficient positive fluid flow is not present in the check valve throughway and pivots to one of a plurality of open positions when at least the sufficient positive fluid flow is present in the check valve throughway. A magnet is coupled to the barrier within the check valve and pivots with the barrier. The magnet is in a first position when the barrier is in the closed position and is in a second position when the barrier is in a threshold open position of the open positions. A magnet sensor is exterior of the check valve located adjacent to the magnet and responding to the magnet in one of the first position and the second position. A controller is coupled to the magnet sensor and selectively causes the pump to activate and run for an amount of time that is dependent on positioning of the magnet.

In some embodiments the magnet sensor is a binary reed switch.

In some embodiments the barrier includes a barrier hanger directly and pivotally attached about a hinge pin. In some versions of those embodiments the magnet is coupled to the barrier hanger immediately adjacent the hinge pin.

In some embodiments the magnet sensor is located within a housing affixed to the check valve.

In some embodiments the distance between the magnet sensor and the magnet in the first position is adjustable via fixed adjustment of the magnet sensor.

In some embodiments the pump control system further includes a pipe nipple coupled to an intake end of the check valve. The pipe nipple optionally has a pressure sensor in communication with an interior thereof.

In some embodiments the controller causes the pump to shut down for an off cycle period when the magnet sensor indicates the magnet is in the first position. In some versions of those embodiments the controller starts the pump after the off cycle period and continues to run the pump during at least a watchdog period, wherein only if the magnet sensor indicates the magnet is in the second position during the watchdog period will the controller continue to operate the pump beyond the watchdog period. In some versions of those embodiments if the controller operates the pump beyond the watchdog period, the controller continues to operate the pump until the first of a maximum continuous pump run time is achieved or the magnet sensor indicates the magnet is in the second position.

In some embodiments the controller starts the pump after the off cycle period and continues to run the pump during at least a watchdog period, wherein only if the magnet sensor indicates the magnet is in the second position at the end of the watchdog period will the controller continue to operate the pump beyond the watchdog period.

Generally, in another aspect, a pump control system for automated control of a pump utilized to draw oil from an oil well is provided and includes a check valve having a check valve throughway and a barrier pivotally arranged in the check valve throughway. The barrier pivots to a closed position blocking the check valve throughway when a sufficient positive fluid flow is not present in the check valve throughway and pivoting to one of a plurality of open positions when at least the sufficient positive fluid flow is present in the check valve throughway. A magnet is coupled to the barrier within the check valve and pivoting with the barrier. The magnet is in a first position when the barrier is in the closed position and is in a second position when the barrier is in a threshold open position of the open positions. A dual state magnet sensor is provided exterior of the check valve adjacent to the magnet and responding to the magnet in one of the first position and the second position. A pipe extension is coupled to an intake end of the check valve and may optionally include a pressure sensor in communication with an interior of the pipe extension. A controller is coupled to the magnet sensor and the pressure sensor and selectively causes the pump to activate and run for an amount of time that is dependent on positioning of the magnet. The controller deactivates the pump when the pressure sensor indicates one of a high pressure situation and a low pressure situation.

In some embodiments the barrier is attached about a hinge pin and the magnet is coupled to the barrier immediately adjacent the hinge pin.

In some embodiments the magnet sensor is located within a housing directly affixed to the check valve.

Generally, in another aspect, a pump control system for automated control of a pump utilized to draw oil from an oil well is provided. The system comprises: a sensor, the sensor monitoring fluid flow in an oil conduit and providing sensor information indicative of the fluid flow; memory storing instructions; and a controller in communication with the sensor and in communication with a pump, the controller operable to execute the instructions stored in the memory, the instructions comprising instructions to: selectively cause the pump to run for at least a watchdog time out period after an off cycle; measure an actual pump run time period while the pump is running; monitor the sensor information from the sensor; continue to run the pump beyond the watchdog time out period when the sensor information indicates oil is sufficiently flowing in the oil conduit prior to the end of the watchdog time out period; and when the pump runs beyond the watchdog time out period, the instructions allow the pump to run until at least one of the actual pump run time equals a maximum continuous pump run time or the sensor information indicates oil is no longer sufficiently flowing in the oil conduit; and cause the pump to enter the off cycle when at least one of the actual pump run time period equals the maximum continuous pump run time or the sensor indicates oil is no longer sufficiently flowing in the oil conduit.

Generally, in another aspect, a pump control system for automated control of a pump utilized to draw oil from an oil well is provided. The system comprises: a sensor, the sensor monitoring fluid flow in an oil conduit and providing sensor information indicative of the fluid flow; memory storing instructions; and a controller in communication with the sensor and in communication with a pump, the controller operable to execute the instructions stored in the memory, wherein the instructions comprise instructions to: provide well information to a remote computing device, the well information including at least one of a duration of an off cycle, a maximum continuous pump run time, a watchdog time out period, and the sensor information; receive adjusted well information from the remote computing device, the adjusted well information including at least one of an adjusted duration of an off cycle, an adjusted maximum continuous pump run time, and an adjusted watchdog time out period; and operate, in response to receiving the adjusted well information, the pump based on the adjusted well information.

Generally, in another aspect, a pump control system for automated control of a plurality of pumps utilized to draw oil from one or more oil wells is provided. The system comprises: a first well data communication module, wherein the first well data communication module is in communication with a first well pump controller and one or more first sensors monitoring a first pump; a second well data communication module, the second well data communication module distinct from the first well data communication module, wherein the second well is in communication with a second well pump controller and one or more second sensors monitoring a second pump; and a master communication module, the master communication module including memory, the memory including instructions to: receive first well data from the first well communication module, the first well data based at least in part on the first sensors and including a first well identifier, a first watchdog time out period, a first off cycle time, and a first pump run time; and receive second well data from the second well communication module, the second well data based at least in part on the second sensors and including a second well identifier, a second watchdog time out period, a second off cycle time, and a second pump run time; determine a well data stream based on the first well data and the second well data; provide the well data stream to a computing device; receive adjusted well data from the computing device, the adjusted well data including adjusted first well data and adjusted second well data; provide adjusted first well data to the first well communication module; and provide adjusted second well data to the second well communication module.

The term "controller" is used herein generally to describe various apparatus relating to the operation of one or more liquid pumps. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a pump control system in general, a controller or processor associated with one or more pump control systems, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Applicants have recognized and appreciated that it would be beneficial to provide automated control of a mechanical pump utilized to draw oil from an oil well. In view of the foregoing, various embodiments and implementations of the present disclosure are directed to control of mechanical pumps utilized to transfer liquids from a fluid reservoir.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the pump control system disclosed herein are described in conjunction with control of a motor driving a pump-jack. However, one or more aspects of the pump control system described herein may be implemented in combination with oil wells that do not utilize a pump-jack and implementation of the one or more aspects described herein in alternatively configured oil wells is contemplated without deviating from the scope or spirit of the claimed invention.

Figure 1A:
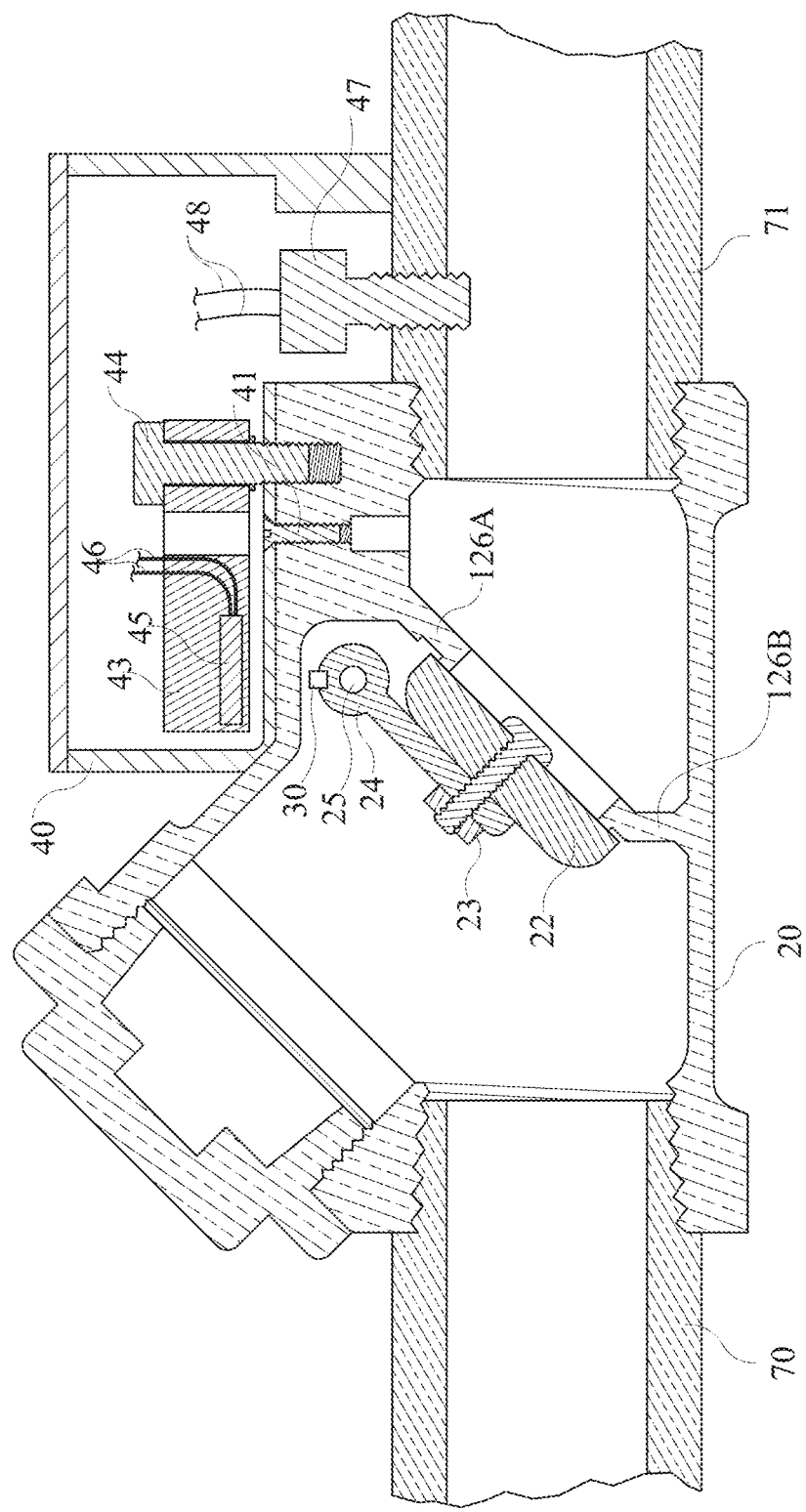
FIG. 1A illustrates a side section view of portions of an embodiment of a pump control system for automated control of a mechanical pump utilized to draw oil from an oil well; a clapper of the pump control system is illustrated in a closed position.
Figure 1B:
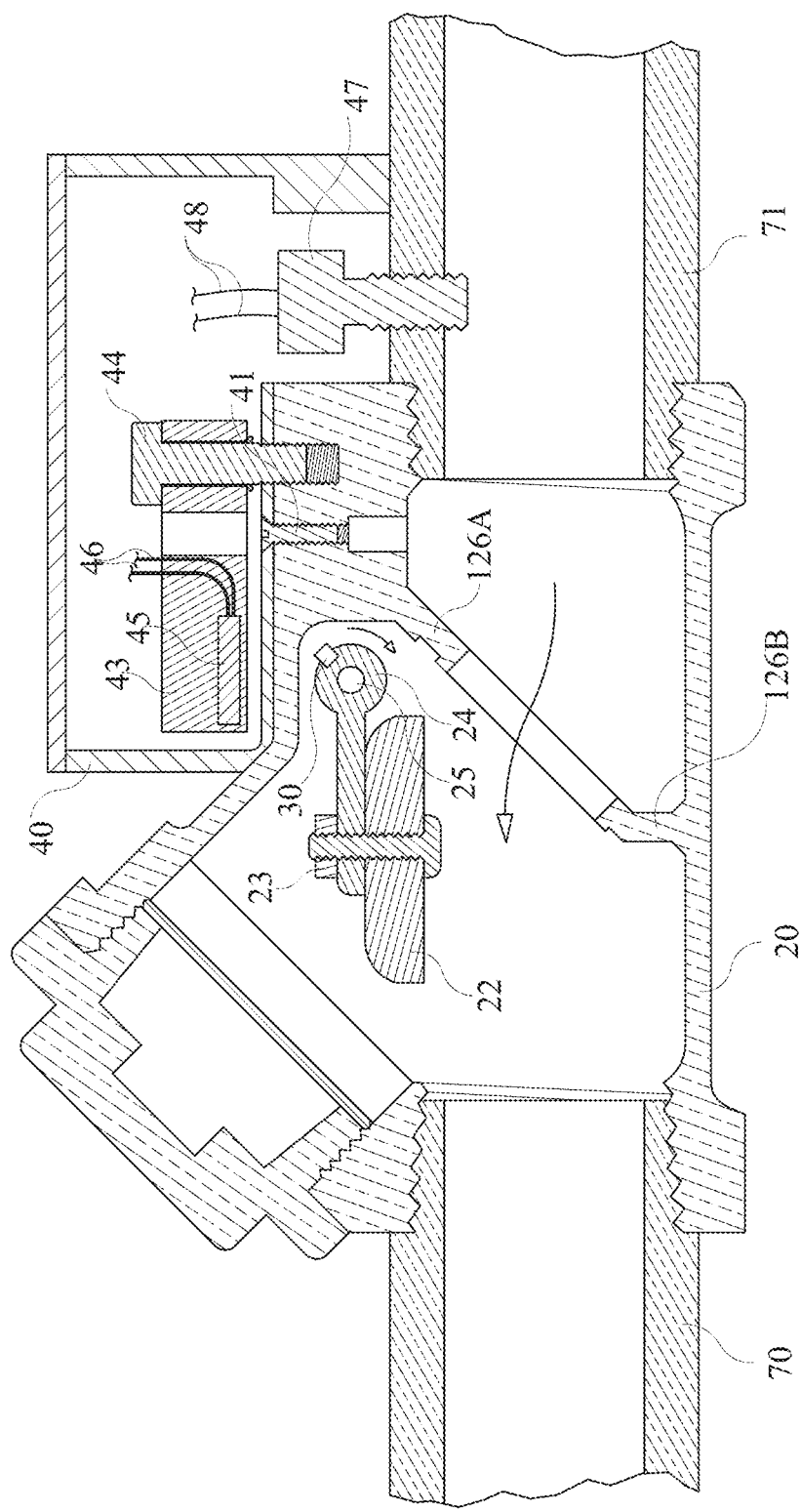
FIG. 1B illustrates a side section view of the embodiment of portions of the pump control system of FIG. 1A; the clapper of the pump control system is illustrated in an open position.

Referring to FIGS. 1A and 1B, a side section view of portions of an embodiment of a pump control system 10 for automated control of a mechanical pump utilized to draw oil from an oil well is illustrated. The portions of the pump control system are illustrated installed along an oil throughway 1 that selectively transports oil pumped from the oil reservoir by the mechanical pump. For example, the oil throughway 1 may be coupled to an oil pipe that selectively transports oil pumped by a positive displacement reciprocating pump driven by a pump-jack.

The embodiment of the pump control system includes a check valve 20 having a pivoting clapper 22. The clapper 22 is pivotally coupled to a hinge pin 25 by a clapper hanger 24. The clapper hanger 24 surrounds the hinge pin 25 and includes an arm that is attached to the clapper 22 via a nut 23 engaging a screw extending through the clapper 22. The clapper 22 is illustrated in a closed position in FIG. 1A and an open position in FIG. 1B. In the closed position in FIG. 1A the clapper abuts protrusions 126A and 126B, thereby blocking a throughway of check valve 20 and preventing backflow of oil or other liquid. In some embodiments the clapper 22 may optionally be biased to the closed position of FIG. 1A. For example, a tension spring may be provided about hinge pin 25 that forces the clapper hanger 24 and the clapper 22 to the closed position. The clapper 22 may be forced to the open position of FIG. 1B when a positive forward force is exerted against the clapper 22 by fluid flowing through the oil throughway 1. It is understood that the clapper 22 may have other open positions than that depicted in FIG. 1B, dependent upon the degree and duration of the fluid flow. The amount of fluid force necessary to move the clapper 22 from the closed position to one or more open positions may optionally be selected based on one or more characteristics of the oil reservoir such as, for example, typical throughput of oil and other liquids, typical viscosity of oil and other liquids, and/or the diameter of oil throughway 1. One of ordinary skill in the art, having had the benefit of the present disclosure, will recognize and appreciate that additional and/or alternative characteristics may be utilized in determining an amount of fluid force necessary to move the clapper 22 from the closed position to one or more open positions A magnet 30 is coupled to the clapper hanger 24 about hinge pin 25. As illustrated in FIGS. 1A and 1B, the magnet 30 pivots about the hinge pin 25 in correspondence with the clapper 22, moving from a first position when the clapper 22 is closed as in FIG. 1A to a second position when the clapper 22 is in the open position illustrated in FIG. 1B. A housing 40 is attached to the check valve 20 and positioned exterior of the check valve 20. A fastener 41 is illustrated extending through an opening in the housing 40 and into a threaded recess of the check valve 20 to secure the housing 40 to check valve 20. In alternative embodiments the housing 40 may be alternatively arranged exterior of the check valve 20. For example, the housing 40 may be alternatively coupled to the check valve 20 (e.g., welded, clamped) and/or coupled to one or both of the piping extensions 70 and 71 extending from respective of the entrance and exit of the check valve 20.

A reed switch housing 43 is provided within the housing 40 and carries a reed switch 45. The reed switch 45 has reed switch wiring 46 extending therefrom that may be coupled to a controller 50 as described herein. In alternative embodiments the reed switch 45 may wirelessly communicate with the controller 50. When the magnet 30 is in the first position of FIG. 1A, the reed switch 45 is in a first state as a result of sufficiently sensing the magnetic field generated by magnet 30. When the magnet 30 is in the second position of FIG. 1B the reed switch is in a second state as a result of not sufficiently sensing the magnetic field generated by magnet 30.

The strength of the magnet 30 and/or the sensitivity of the reed switch 45 may be selected such that the reed switch 45 is responsive to the magnet 30 when it is in the first position but is not responsive to the magnet when it is in the second position. The strength of the magnet 30 and/or the sensitivity of the reed switch 45 may further be selected such that the reed switch 45 is (or is not) responsive to the magnet 30 at various positions between the first position and the second position. For example, in some implementations it may be desired that the reed switch 45 be responsive to the magnet 30 from a closed position to approximately a half open position and not be responsive to the magnet 30 from just over approximately a half open position to a full open position. An adjustment screw 44 extends through the reed switch housing 43 and housing 40 and is threadably received in check valve 20. The adjustment screw 44 is freely rotatable within reed switch housing 43. The vertical positioning of the screw 44 relative to reed switch housing 43 is fixed by virtue of the screw head and an illustrated protrusion extending peripherally of the screw 44 on an opposite side of housing 43 from the screw head. The adjustment screw 44 may be adjustably rotatably threaded in check valve 20 to adjustably increase or decrease the distance between the check valve 20 and the reed switch housing 43 (and resultantly reed switch 45). Adjustment of the screw 44 enables calibration of the reed switch 45 and magnet 30 such that the reed switch 45 is responsive to the magnet 30 at desired orientation(s) of the clapper 22 and is not responsive to the magnet 30 at other desired orientation(s) of the clapper 22. In alternative embodiments the housing 44 may include a threaded recess for receiving screw 44. Such recess may enable adjustability of reed switch housing 43 and may be in addition to or in lieu of any recess in check valve 20.

In alternative embodiments the positioning of the magnet 30 and/or reed switch 45 may be adjusted such that the reed switch 45 does not sufficiently sense the magnetic field generated by magnet 30 when the clapper 22 is closed, but instead sufficiently senses the magnetic field generated by magnet 30 when the clapper 22 is sufficiently opened. For example, the positioning of the magnet 30 may be adjusted counterclockwise approximately ninety degrees about the hinge pin 25 as viewed in FIGS. 1A and 1B. In alternative embodiments a dynamic magnet sensor that reads and outputs a range of measured magnetic fields may alternatively or additionally be utilized and the controller may read such output to determine if a sufficient magnetic field is present and/or not present. In some embodiments the check valve 20 may be a check valve that is modified by attaching magnet 30 at a desired location on a freely pivoting clapper or an extension coupled to and moving with the clapper.

A pressure sensor 47 is also provided in housing 40 and extends through the housing 40 and piping extension 71 in communication with the interior of piping extension 71. The pressure sensor 47 may be sealingly engaged with the piping extension 71 and monitors the pressure within piping extension 71. The pressure sensor 47 has pressure sensor wiring 48 extending therefrom that may be coupled to a controller 50 as described herein. In alternative embodiments the pressure sensor 47 may wirelessly communicate with the controller 50. For example, the pressure sensor 47 may communicate with a pump controller, such as controller 50 of FIG. 3 and/or one or more other computing devices via Bluetooth, via cellular phone communication, via Wi-Fi, via satellite communication, and/or via other communications protocol. In some implementations, the pressure sensor 47 may be a pressure switch that is responsive to one or more pressures such as a high pressure and/or a low pressure situation in piping extension 71—or an oil flowing and/or an oil not flowing situation in piping extension 71. The parameters for a high pressure and/or low pressure situation (or other situation(s)) may be dependent upon the particular implementation and may be selected by one of ordinary skill in the art having had the benefit of the present disclosure to conform with desired and/or mandated parameters for a given installation. In alternative embodiments, the pressure sensor 47 may be a dynamic pressure sensor that reads and outputs a range of measured pressure and the controller may read such output to determine, for example, if a low and/or high pressure situation is present. In some embodiments piping extension 70 and/or 71 may be a pipe nipple threadedly coupled to an end of the check valve 20. In certain installation implementations at least the check valve 20, piping extension 71, and housing 40 may be installed along an existing segment of oil piping and replace such segment.

In some embodiments, pressure sensor 47 may be positioned in one or more alternate positions (other than the position illustrated in FIG. 1A), where it is operable to monitor pressure in an oil conduit. For example, pressure sensor 47 may be sealingly engaged with the piping extension 70, and may monitor the pressure within piping extension 70, and/or pressure sensor may be located at one or more other locations where the pressure sensor 47 is sealingly connected to an oil conduit and may monitor pressure within the oil conduit. For instance, the pressure sensor 47 may be coupled to a well head (located upstream of piping extension 71—to the "right" in FIG. 1A) or coupled to a conduit extending from the well head and monitor pressure in the well head. In some embodiments, check valve 20 may not be present at all. For example, in some embodiments, check valve 20 may be omitted and a pressure regulator optionally provided in place of the check valve 20. In some of those implementations, the pressure sensor 47 may optionally be coupled to a pressure port of the pressure regulator or provided on an upstream or downstream side of the pressure regulator In some implementations, reed switch 45 and magnet 30 may optionally be omitted. For example, a check valve may be present that includes one or more of the components described with respect to FIG. 1A and FIG. 1B, but the reed switch 45 and magnet 30 may not be present. In some of those implementations, one or more of the functions performed by the combination of reed switch 45 and magnet 30 (e.g., monitoring oil flow through a conduit) may be performed by one or more other sensors, such as pressure sensor 47. For example, sensor information provided by pressure sensor 47 may indicate whether oil is flowing or not flowing, and/or the extent to which oil is flowing. For instance, in some embodiments when sensor information provided by pressure sensor 47 indicates at least a first pressure, it may be indicative of oil sufficiently flowing. Also, for instance, when sensor information of pressure sensor 47 indicates less than the first pressure, it may be indicative of no oil flow or lack of sufficient oil flow. Also, for instance, when sensor information provided by pressure sensor 47 indicates a first pressure, it may be indicative of a first rate of oil flow and when pressure sensor 47 indicates a second pressure, it may be indicative of a second rate of oil flow. In some embodiments, both pressure sensor 47 and the combination of magnet 30 and reed switch 45 may be utilized to determine oil flow (e.g., sensor information from pressure sensor 47 and reed switch 45 may both be taken into account in determining whether oil is flowing and/or the extent to which oil is flowing).

Figure 2:
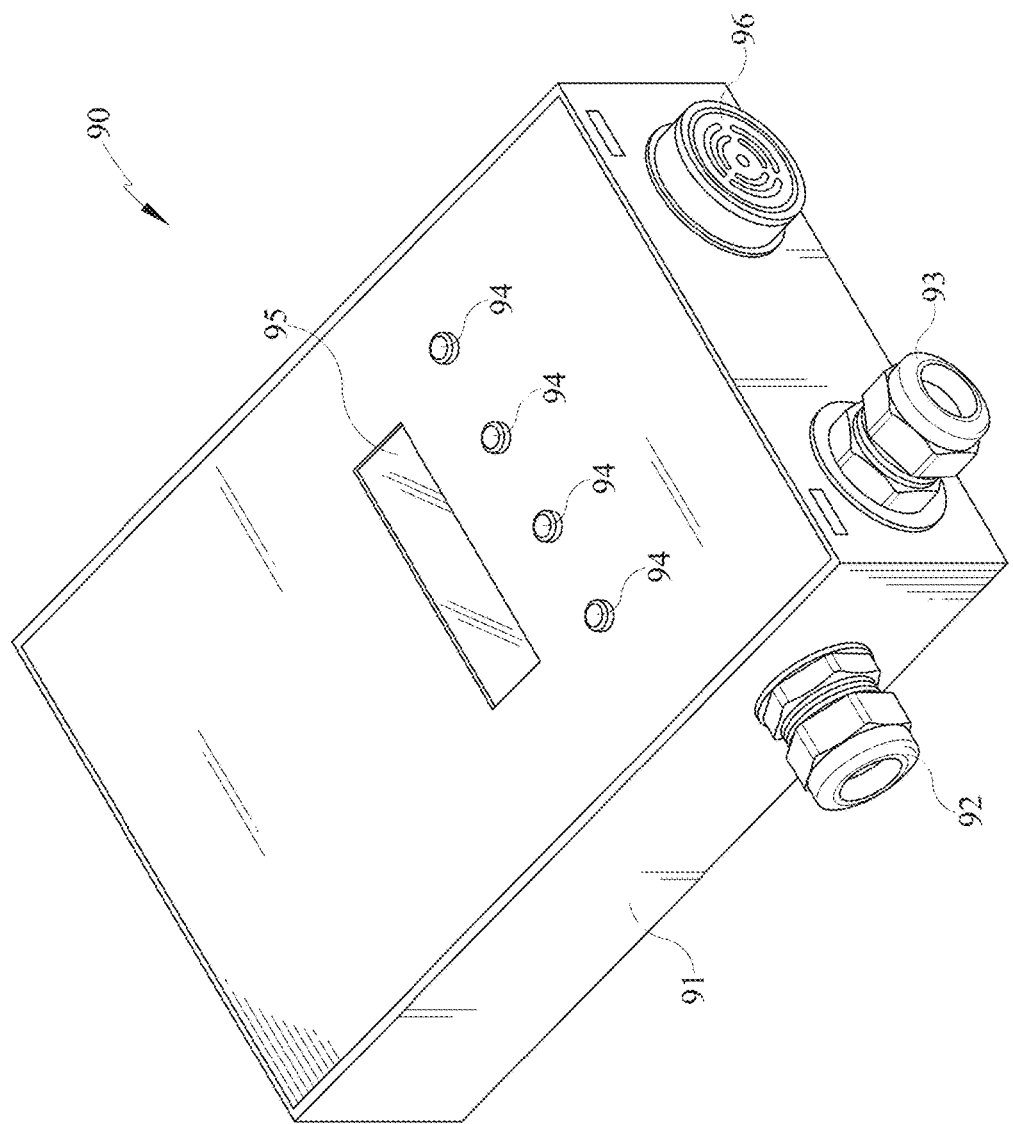
FIG. 2 illustrates a perspective view of a control panel of the embodiment of the pump control system.

FIG. 2 illustrates a perspective view of a control panel 90 of the pump control system of FIG. 1. The control panel 90 includes an enclosure 91 and wiring inputs/outputs 92 and 93 providing access to the interior of the enclosure 91 for power and/or communication wires. The control panel 90 also includes input keys 94 and a display 95 enabling a user to interface with the pump control system. In alternative embodiments an additional or alternative user interface may be provided. The control panel 90 also has a speaker 96 for providing audible warnings and/or interface related communications to a user.

Figure 3:
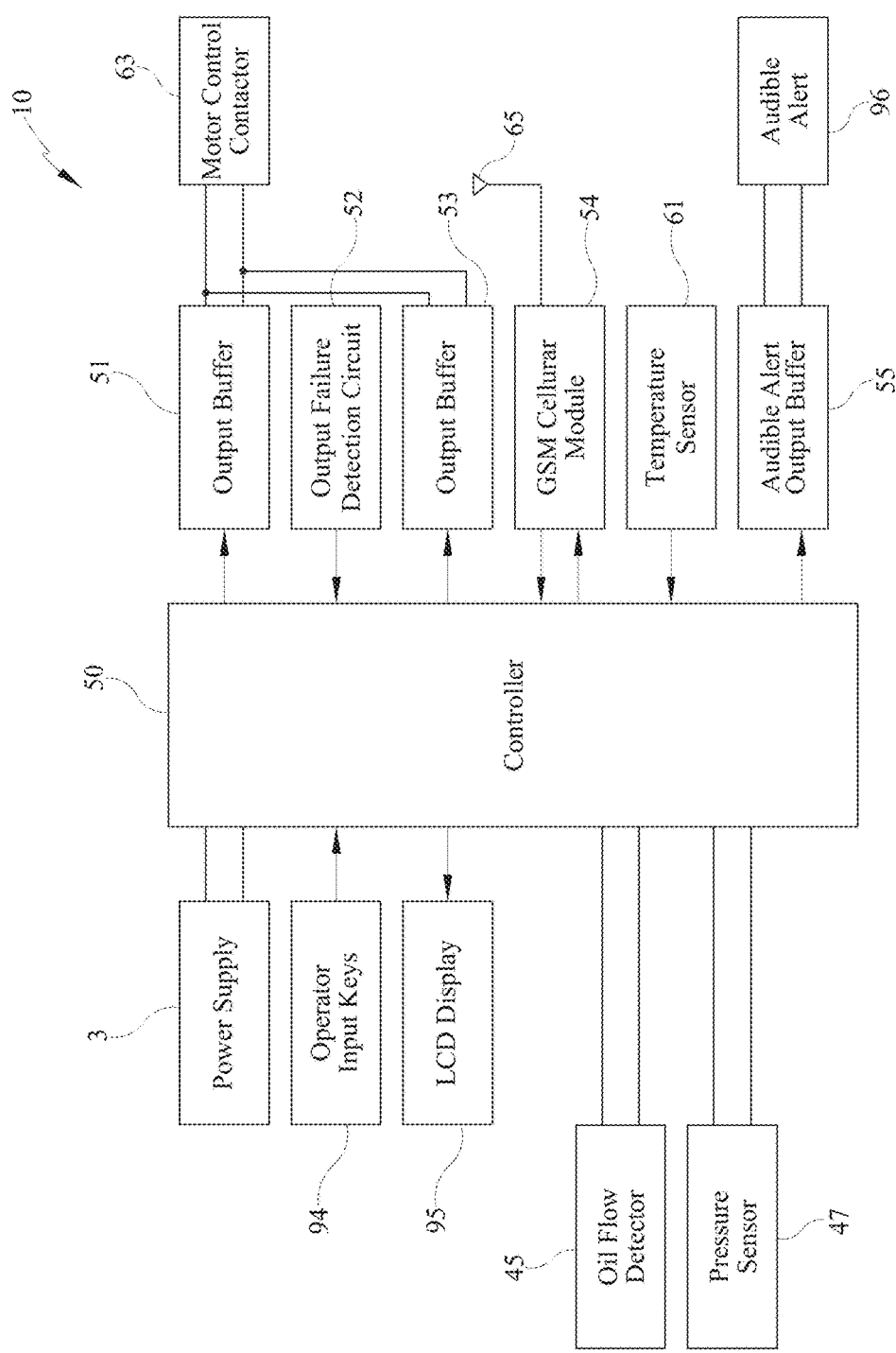
FIG. 3 schematically illustrates the embodiment of the pump control system.

FIG. 3 schematically illustrates the pump control system 10. A power supply input 3 is provided for connection to a power supply such as, for example, a 120/240 VAC supply. The power supply input 3 may provide power for one or more aspects of the system such as, for example, the controller 50, the sensors 45, 47, and/or the motor control for the motor driving the mechanical pump. The oil flow detector 45 and pressure sensor 47 are each coupled to and provide input to the controller 50. The operator input keys 94 are also coupled to and provide input to the controller 50 when actuated by a user. A temperature sensor 61 is also illustrated providing input to the controller 50. In some embodiments the temperature sensor 61 measures ambient temperature. In some versions of those embodiments the temperature sensor 61 is located within the control panel 40. The controller 50 may optionally cause the mechanical pump utilized to draw oil from an oil well to cease operation when the ambient temperature becomes too cold and/or too hot. For example, the controller 50 may cease oil well production during low temperatures that are highly conducive to pipe freeze-ups due to water contamination.

The controller 50 drives display 95 to display selected information to a user. The controller 50 also drives audible alert speaker 96 via audible alert output buffer 55 to selectively provide an audible alert to a user. For example, the controller 50 may cause an audible alert to be sounded prior to the mechanical pump being actuated and/or when an error condition is present. Controller 50 drives motor control contactor 63 via output buffer 51. The motor control contactor 63 activates and/or deactivates the motor that in turn drives the mechanical pump of the well. The motor may also optionally be driven at a plurality of speeds through motor control contactor 63 via output buffer 51. In some embodiments the output buffer 51 may include a triac control that includes feedback. The output buffer 51 also includes an output failure detection circuit 52 that monitors for failures in the output buffer 51 and/or received feedback. Controller 50 may utilize input from output failure detection circuit 52 to correct output provided over output buffer 51 and/or to recognize and signal an error condition that requires maintenance. A secondary output buffer 53 may also be provided monitoring output buffer 51 and including a crowbar circuit to minimize damage from an overvoltage condition.

A GSM cellular module 54 is also in communication with the controller 50 and an antenna 65. The GSM cellular module 54 is an example of a communications module that may be utilized to enable control of the pump control system 10 remotely via, for example, a cellular phone or another computing device. The controller 50 may be addressable and the cellular phone may transmit signals to controller 50 via antenna 65 and cellular module 54 to provide for programming, control, monitoring, and/or resetting of one or more aspects of pump control system 10. For example, in some embodiments a user may control the pump control system utilizing a phone in the same manner as they could utilizing the input keys 94. Elements 51-55 may optionally be integrated in a common package with controller 50 and/or may comprise one or more separate components and/or circuits. Controller 50 and/or elements 51-55 and 61 may optionally be housed in the control panel 90. Control panel 90 may be provided remote from check valve 20 and housing 40 in some embodiments. In other embodiments control panel 90 and housing 40 may be immediately adjacent one another and/or combined to form a singular housing that is optionally coupled directly to check valve 20.

Optionally, multiple pump control systems in an oil field may be provided in a network configuration and controlled via a common cellular or other communications module. For example, controller 50 may be associated with a communication module that may send well data to and/or receive adjusted well data from another communication module (e.g., a stand-alone module or a module that is part of a control system of another pump). As an example, controller 50 may be located in proximity to a pump (e.g., coupled to conduit and/or other structure associated with the pump, or located within a certain distance of the pump such as less than about fifty, twenty, or ten feet) and may send well data to a master communication module that sends some or all of the well data to a remote computing device via satellite or other communications medium. The remote computing device may receive the well data via a communication module of the computing device, adjust one or more variables, such as duration of an off cycle and/or a watchdog time out period, and provide adjusted variables back to the master communication module, which then provides the adjusted variables to controller 50. As an example, controller 50 may provide a master communication module with one or more variables and/or with sensor information from reed switch 45 and/or pressure sensor 47. The master communication module may provide all or aspects of such variables/sensor information to a remote computing device, and the remote computing device may adjust one or more of the variables based on the sensor information, based on historical data from one or more other oil pump runs (e.g., based on past pump runs of the same pump and/or other pumps), and/or based on manual input from a user. For example, the remote computing device may receive well data that is related to whether oil flow is detected, and an actual pump run time from controller 50, and perform one or more steps of the methods illustrated in the flowcharts in FIGS. 4 and 5 (e.g., steps 106 to 109) to adjust a duration of an off cycle of a pump. The adjusted off cycle of the pump may be provided to master communication module, which provides the adjusted off cycle to the controller 50, which may then adjust operation of an associated pump. As another example, the controller 50 may perform all of the steps of the methods illustrated in the flowcharts in FIGS. 4 and/or 5, and send one or more variables determined based on such steps (e.g., a duration of an off-cycle) and/or other parameters to the master communication module (e.g., actual pump run time (s), down hole pressure, oil pumped (e.g., as estimated based on sensor information)). One or more of the variables may be provided to the remote computing device and automatically and/or manually adjusted via the remote computing device and the adjusted variables may be sent back to the controller 50 via the master communication module to have the controller 50 operate based on the adjusted variables (with optional further refinement to the adjusted variables by the controller 50 through continuing iterations of the steps of FIGS. 4 and/or 5).

Figure 4:
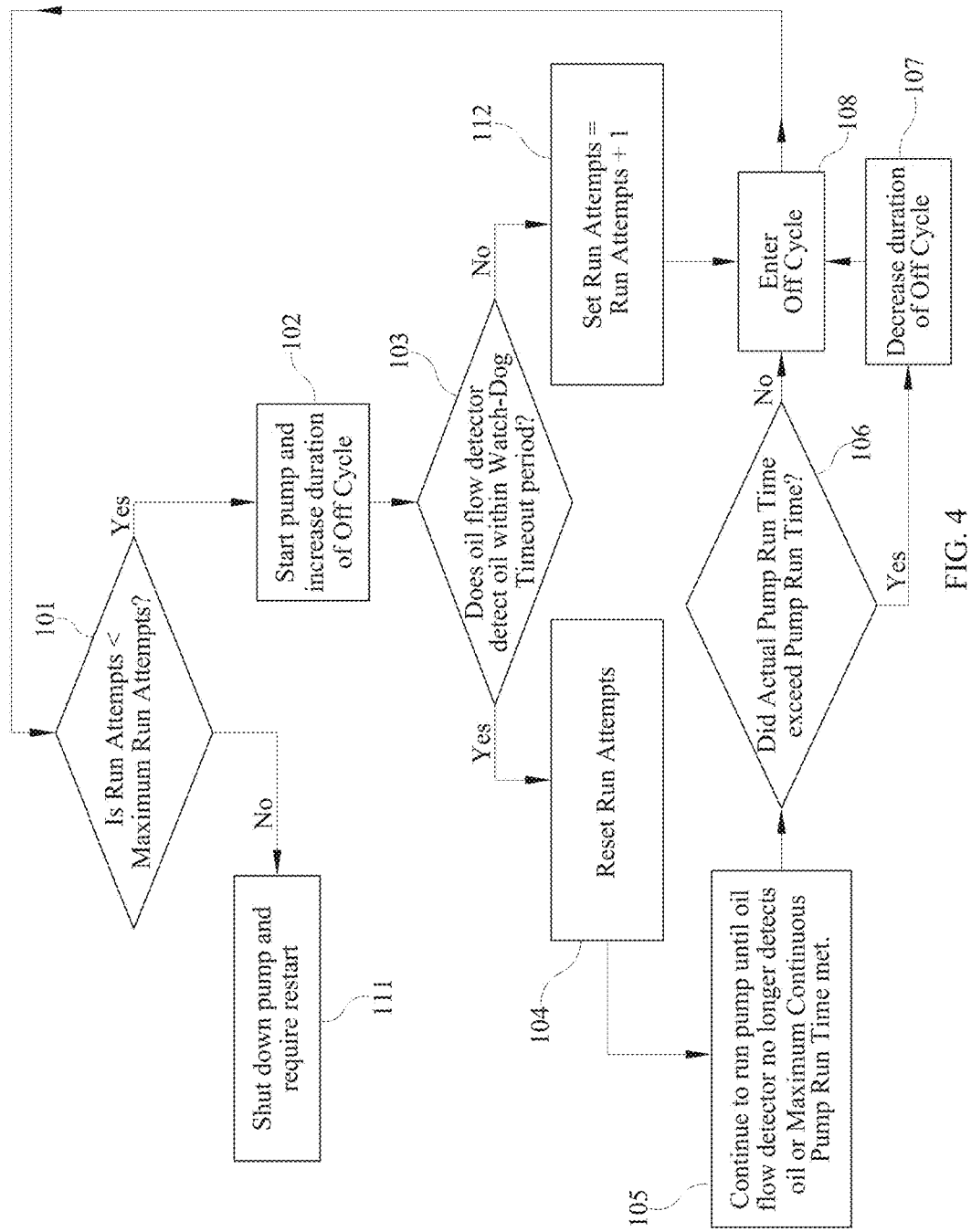
FIG. 4 illustrates a flow chart of an embodiment of a method of automated control of a mechanical pump.

FIG. 4 illustrates a flow chart of an embodiment of a method of automated control of a mechanical pump. In some embodiments the method may be implemented in controller 50 of pump control system 10. At step 101 it is determined if the variable "Run Attempts" is less than the set "Maximum Run Attempts." Run Attempts may be incremented as described herein and indicates a cycle of running the mechanical pump for a period of time without sensing a sufficient flow of oil (e.g., without sensing oil flow via reed switch 45). Maximum Run Attempts represents the maximum number of consecutive Run Attempts that may occur before controller 50 shuts down the mechanical pump, ceases automated control of the pump, and requires user intervention via input keys 94 and/or cellular module 54 to restart the pump at step 111. When Run Attempts is not less than the Maximum Run Attempts there may be a problem with the oil well, the oil line, the pump, and/or other component. In some embodiments Maximum Run Attempts may be adjusted by a user to a desired number. For example, in some embodiments Maximum Run Attempts may be user settable from a minimum of 1 to a maximum of 10.

If Run Attempts is less than Maximum Run Attempts, then the pump is started (e.g., via control of a motor driving a pump-jack) at step 102. The duration of an Off Cycle is also increased at step 102. For example, in some embodiments the Off Cycle may be increased by 15 seconds. Also, for example, in other embodiments the Off Cycle may be increased by 30 seconds. The Off Cycle is initially user settable and is an amount of time that the pump is idle (e.g., via cutting off and/or reducing the power of a motor driving a pump-jack). The Off Cycle may initially be set based upon the normal amount of time that the pump has been known to be idle based on historical data and/or other parameters (e.g., pump strength, well depth, well productivity). For example, in some embodiments the Off Cycle may be user settable from a minimum of 30 seconds to a maximum of 999 minutes. By increasing and/or decreasing the duration of the Off Cycle during automated control of the pump as described herein, the duration of the Off Cycle will be modified as conditions of the well and/or pump equipment change. As described herein, the duration of the Off Cycle may be automatically adjusted based on a user set desired Pump Run Time.

An oil flow detector (e.g., reed switch 45 and/or pressure sensor 47) is then monitored to determine whether a sufficient flow of oil is sensed within a watchdog timeout period at step 103. For example, in some embodiments the reed switch 45 may be monitored to ensure it indicates the clapper 22 is sufficiently open during a majority of the watchdog timeout period. Also, for example, in some embodiments a magnetic sensor that dynamically monitors the magnitude of the magnetic field may be provided in lieu of reed switch 45. In some versions of those embodiments the magnetic sensor may be monitored to determine if the time weighted average of the magnetic field is indicative of a sufficiently open position of the clapper 22. As yet another example, in some embodiments pressure sensor 47 may be utilized instead of or in additional to reed switch 45/magnet 30 to determine whether oil is flowing through a conduit. The watchdog timeout period may be user settable and represents a period of time within which oil may be expected to flow given existing parameters (e.g., pump strength, well depth, well productivity). For example, in some embodiments the watchdog timeout period may be user settable from a minimum of 30 seconds to a maximum of 3 minutes. In some embodiments, the watchdog timeout period may be determined by a computing device (e.g., adjusting the watchdog timeout period based on historical runs of the pump and/or other pumps; and/or adjusting the watchdog timeout period based on one or more alternate techniques). An adjusted watchdog timeout period may be determined based on, for example, actual pump run times and/or one or more other variables (e.g., down hole pressure, fluid pumped). Also, for example, the computing device may determine an adjusted watchdog timeout period and provide the period to a user operator to verify the adjustment and/or for additional adjustments.

If oil is not detected within the watchdog timeout period, then at step 112 Run Attempts will be incremented. The Off Cycle will then be entered at step 108. After the Off Cycle is completed, the automated control again returns to step 101. If oil is detected within the watchdog timeout period at step 103, then at step 104 the Run Attempts variable is reset to zero.

At step 105 the pump is allowed to continue to run until either the oil flow detector no longer detects a sufficient oil flow or a Maximum Continuous Pump Run Time is met. In some embodiments the Maximum Continuous Pump Run Time may be based on the Pump Run Time (e.g., 4 times the Pump Run Time). The Pump Run Time may be set based upon the normal amount of time that the pump has been known to run based on historical data and/or other parameters (e.g., pump strength, well depth, well productivity). For example, in some embodiments the Pump Run Time may be user settable from a minimum of 30 seconds to a maximum of 999 minutes. In some embodiments the Maximum Continuous Pump Run Time may be set independently of the Pump Run Time.

When either the oil flow detector no longer detects a sufficient oil flow or a Maximum Continuous Pump Run Time is met, then at step 106 it is determined whether the Actual Pump Run Time (the time since starting the pump at step 102) is greater than the Pump Run Time. In other words, it is determined whether the pump was active longer than the user set Pump Run Time. If not, then the Off Cycle is entered at step 108 as described herein. As will be understood, in the illustrated embodiment of FIG. 4, if at step 106 it is determined that the pump was not active longer than the user set Pump Run Time, then the duration of the Off Cycle entered immediately thereafter will be increased relative to the previous Off Cycle (due to the increase of the Off Cycle at step 102). In some embodiments the automatic control may cause the pump to run for at least the Pump Run Time if the sensor is on at the end of the watchdog timeout Period (regardless of whether the sensor cuts off prior to the end of such Pump Run Time). In some versions of those embodiments if the sensor cuts off before the end of the Pump Run Time, then the Off Cycle will be directly entered at step 108 following the Pump Run Time. In some other versions of those embodiments if the sensor is off at the end of the Pump Run Time, then the Off Cycle will be directly entered at step 108 following the Pump Run Time.

If at step 106 it is determined that the Actual Pump Run Time is greater than the Pump Run Time, then at step 107 the duration of the Off Cycle is decreased. The Off Cycle is then entered at step 108 as described herein. In some embodiments the duration of the Off Cycle is decreased to a greater extent than it was increased at step 102. For example, in some embodiments at step 107 the Off Cycle may be decreased by 30 seconds at step 107 and increased by 15 seconds at step 102. As will be understood, in such embodiments, if it is determined that the pump was active longer than the user set Pump Run Time, then the duration of the Off Cycle entered immediately thereafter will be decreased relative to the previous Off Cycle (due to the decrease in the Off Cycle duration at step 107 being greater than the increase at step 102). In some embodiments the Off Cycle is decreased by a static amount at step 107. In other embodiments the degree of the decrease of the duration of the Off Cycle may be proportional or otherwise related to the length of the Actual Pump Run Time.

To determine whether the oil flow detector no longer detects a sufficient oil flow in some embodiments, the reed switch 45 may be monitored to determine whether the clapper 22 is sufficiently closed over an analysis period. Also, for example, in some embodiments, if the reed switch 45 indicates the clapper 22 is sufficiently closed at any point, it may be determined that a sufficient oil flow is no longer detected. Also, for example, in some embodiments a magnetic sensor that dynamically monitors the magnitude of the magnetic field may be provided in lieu of reed switch 45. In some versions of those embodiments the magnetic sensor may be monitored to determine if a time weighted average of the magnetic field is indicative of a sufficiently closed position of the clapper 22, if a plurality of sufficiently close readings are indicative of a sufficiently closed position of the clapper 22, and/or if any readings are indicative of a sufficiently closed position of the clapper 22. In some embodiments, pressure sensor 47 may be utilized in addition or in lieu of reed switch 45 to determine and/or verify oil flow reading.

Figure 5:
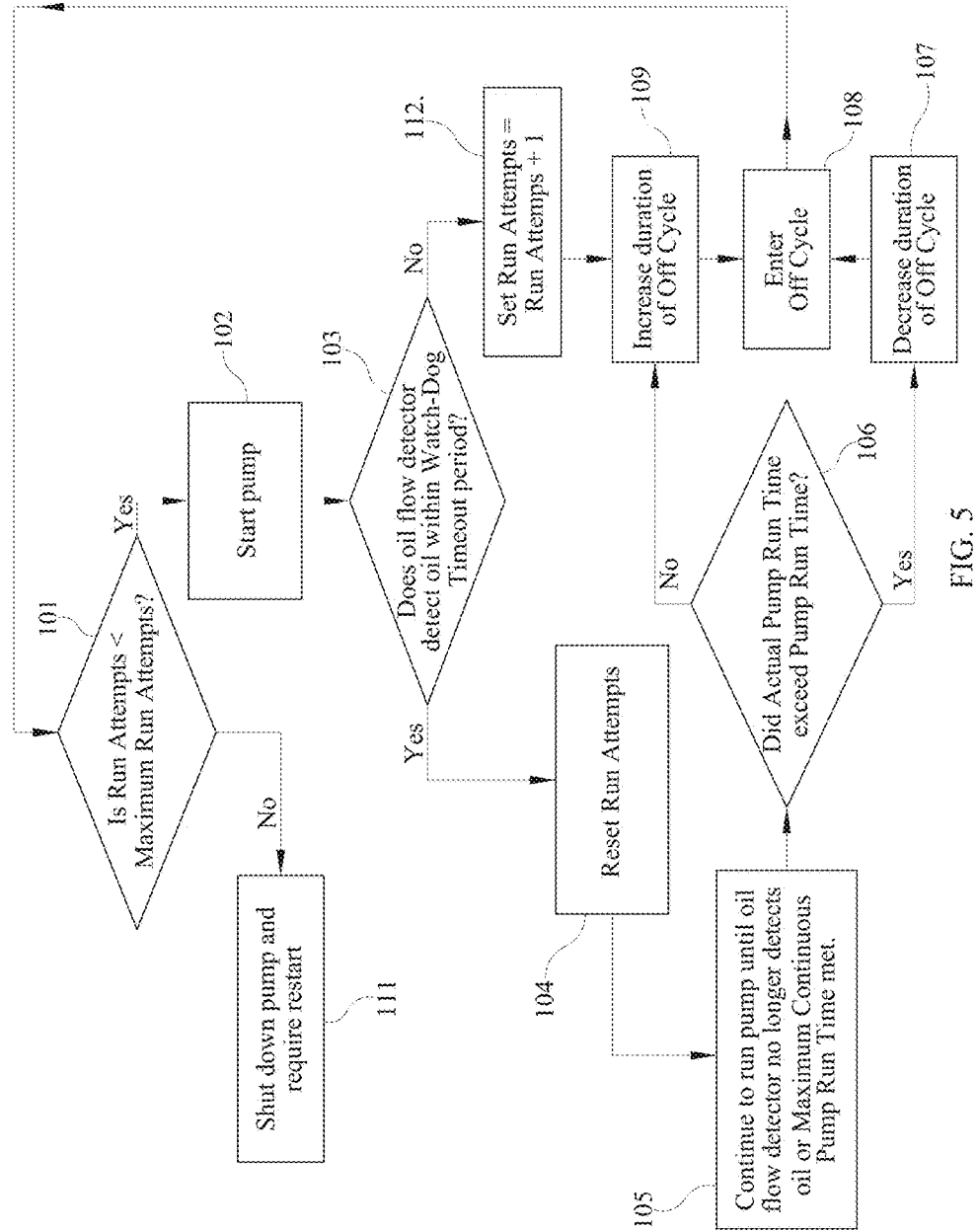
FIG. 5 illustrates a flow chart of another embodiment of a method of automated control of a mechanical pump.

FIG. 5 illustrates a flow chart of another embodiment of a method of automated control of a mechanical pump. Several aspects of the flow chart of FIG. 5 are similar to the flowchart of FIG. 4 and like numbering between the two refer to like steps. In some embodiments the method may be implemented in controller 50 of pump control system 10. At step 101 it is determined if the variable "Run Attempts" is less than the set "Maximum Run Attempts." If Run Attempts is less than Maximum Run Attempts, then the pump is started at step 102. In the embodiment of FIG. 5, it is to be noted that the duration of the Off Cycle is not increased at step 102.

An oil flow detector is then monitored to determine whether a sufficient flow of oil is sensed within a watchdog timeout period at step 103. If oil is not detected within the watchdog timeout period, then at step 112 Run Attempts will be incremented. The duration of the Off Cycle will then be increased at step 109 prior to entering the Off Cycle at step 108. After the Off Cycle is completed, the automated control again returns to step 101.

If oil is detected within the watchdog timeout period at step 103, then at step 104 the Run Attempts variable is reset to zero.

At step 105 the pump is allowed to continue to run until either the oil flow detector no longer detects a sufficient oil flow or a Maximum Continuous Pump Run Time is met. When either the oil flow detector no longer detects a sufficient oil flow or a Maximum Continuous Pump Run Time is met, then at step 106 it is determined whether the Actual Pump Run Time is greater than the Pump Run Time. If not, then the duration of the Off Cycle will then be increased at step 109 prior to entering the Off Cycle at step 108. In some embodiments the duration of the Off Cycle will be increased the same at step 109 regardless of whether step 112 or step 106 precedes step 109. In other embodiments the duration of the Off Cycle may be increased more if step 112 precedes step 109 than if step 106 precedes step 109. Also, in some alternative embodiments if it is determined at step 106 that the Actual Pump Run Time is not greater than the Pump Run Time, then the Off Cycle may be directly entered at step 108 without first increasing the duration of the Off Cycle at step 109.

If at step 106 it is determined that the Actual Pump Run Time is greater than the Pump Run Time, then at step 107 the duration of the Off Cycle is decreased. IN some embodiments the increase in the Off Cycle duration at step 109 and the decrease in the Off Cycle duration at step 107 may be the same amount. In other embodiments the increase in the Off Cycle duration at step 109 and the decrease in the Off Cycle duration at step 107 may be different amounts. In some embodiments the increase and/or decrease in the Off Cycle duration may be static and in other embodiments the increase and/or decrease in the Off Cycle may be based on one or more parameters (e.g, Actual Pump Run Time, deviation from initially set Off Cycle, analysis of one or more previous automated run cycles). The Off Cycle is then entered at step 108 as described herein.

In some implementations, the methods illustrated in FIG. 4 and FIG. 5 may be performed by the controller 50. For example, controller 50 may be connected to the well pump and adjustments to the duration of the off cycle may be determined by controller 50 locally. In some implementations, controller 50 may control the operation of the well pump and additionally provide one or more other computing devices with sensor information and/or with additional or alternative information (e.g., watchdog timeout period, actual pump run time, maximum run attempts); and the one or more other computing devices may adjust one or more variables and provide controller with the adjusted variables. For example, controller 50 may provide a remote computing device with pressure sensor information via a communication module, and the remote computing device may determine, based on the pressure sensor information, an adjusted duration of off cycle; and the computing device may provide the controller 50, via satellite or other communication medium, with one or more of an adjusted watchdog time period, adjusted actual pump run time, adjusted duration of off cycle, etc. Also, for example, controller 50 may itself dynamically adjust an off cycle duration, and periodically provide a remote computing device with the current off cycle duration and other information (e.g., actual pump run time, down hole pressure, fluid pumped) via a communication module, and the remote computing device may determine, based on the provided information, an adjusted duration of off cycle and/or other adjusted parameters. The remote computing device may provide the controller 50, via satellite or other communication medium, with one or more of the adjusted duration of off cycle and/or other adjusted parameters.

Figure 7:
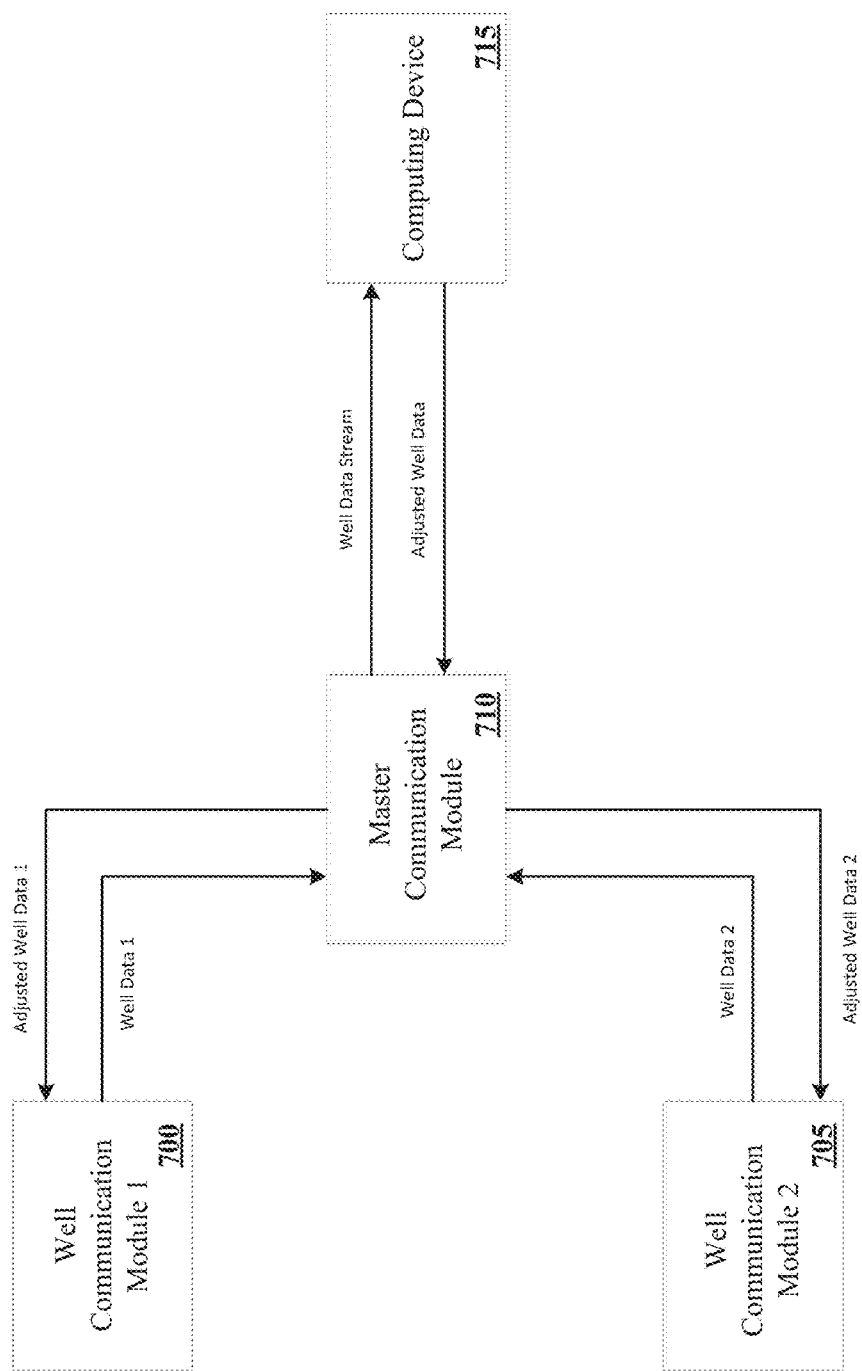
FIG. 7 illustrates an example of providing a master communication module with well data from a plurality of well communication modules, and the master communication module providing a well data stream to a computing device for potential adjustment to the well data.

FIG. 7 illustrates an example of providing a master communication module with well data from a plurality of well communication modules, and the master communication module providing a well data stream to a computing device for potential adjustment to the well data. The example includes a first well communication module 700 and a second well communication module 705. Two modules, communication module 700 and communication module 705, are illustrated in FIG. 7 for purposes of example only. In other embodiments additional communications modules may be provided, each being associated with a controller operating one or more pumps. For example, an oil field may include multiple pumps spread over an area and each pump may be associated with a controller and communication module. The various communication modules may be in communication with one or more master communication modules as described herein. Well communication modules 700 and 705 may each be in communication with a controller that shares one or more characteristics with controller 50. For example, first well communication module 700 may be in communication with a first well controller that controls a first well pump of a first well and second well communication module 705 may be in communication with a second well controller that controls a second well pump of a second well. In some embodiments, the well communication modules 700 and 705 may be located proximate to the first well and the second well. For example, the first well communication module may be located near one or more of the components illustrated in FIG. 1A and/or FIG. 1B. In some implementations, well communication modules 700 and/or 705 may not be located near the first well and the second well and may be in wireless communication with well pump controllers, such as via cellular, satellite, and/or Wi-Fi communication.

Well communication modules 700 and 705 each provide well data to a master communication module 710. Well Data 1 and Well Data 2 may include, for example, sensor information, oil flow information, temperature information, and/or information from one or more other components, as described herein. Additionally or alternatively, Well Data 1 and/or Well Data 2 may include one or more variables that may be utilized by a controller to control the operation of a pump, such as duration of an off cycle, maximum pump run time, a watchdog time, and/or one or more other variables. Well communication modules 700 and 705 may be in communication with master communication module 710 via, for example, RF communication, wired communication, satellite communication, Wi-Fi communication, cellular communication, and/or one or more other communication protocols. In some implementations, master communication module 710 may itself directly control one or more pumps. For example, master communication module 715 may control a third pump. In some embodiments, communication module 710 may itself not directly control one or more pumps.

In some implementations, master communication module 710 may modify the well data that is provided by one or more well communication modules to create a well data stream, and then send the well data stream to a computing device 715. For example, master communication module 710 may receive well data that includes periodic sensor readings. Master communication module 710 may identify repeat data in the well data and compress the data before providing the well data in a well data stream to a computing device 715. For example, well communication module 700 may provide sensor information from sensor 47 to master communication module 710 on a periodic basis, and the sensor information may include extended time periods with no change in the provided value. Master communication module 710 may condense the well data, reorganize the well data, and/or otherwise change the well data provided by the well communication modules 700 and 705 before providing computing device 715 with the well data stream. Master communication module 710 may provide a well data stream that includes a compressed version of Well Data 1 and/or Well Data 2 via one or more communication protocols as described herein.

Computing device 715 may receive the well data stream from master communication module 710 and utilize the well stream data to adjust one or more variables related to the operation of one or more well pumps. For example, computing device 715 may identify Well Data 1 from the well data stream and, utilizing provided pump run times and/or other sensor information, adjust the duration of the off cycle of the well pump associated with well communication module 700. In some embodiments, the adjusted duration of an off cycle may be determined by computing device 715 utilizing a method that shares one or more aspects with the methods illustrated in FIGS. 4 and 5, such as steps 106 to 109. In some embodiments, additional and/or alternative techniques may be utilized by the computing device 715 to determine an adjusted duration of an off cycle. For instance, heuristics may be used that are based on historical data associated with the well communication modules 700 and 705 and/or based on historical data from other well communication modules (optionally having one or more characteristics in common with communication modules 700, 705). Computing device 715 may provide adjusted well data to master communication module 710, which may provide the well communication modules 700 and 705 with adjusted well data. The pump controllers associated with the well communication modules 700 and 705 may utilize the adjusted well data to adjust operation of the associated pumps.

In some implementations, computing device 715 may be remote from master communication module 710. For example, an oil field may include a plurality of wells, each with a communication module. The well communication modules may be in communication with one or more master communication modules and the master communication module(s) may compress data from the well communication modules and provide one or more computing devices with the compressed data. Computing device 715 may be located, for example, at a central location near the oil field and/or computing device 715 may be located geographically remote from the oil wells and receive well data and send adjusted well data via satellite communication.

As described above, in some embodiments, computing device 715 may determine one or more adjusted variables (duration of off cycle, watchdog timeout period, maximum run attempts, etc.) based on heuristics. For example, one or more adjusted variables may be determined based on historical trends of past runs of pump controllers. For example, computing device 715 may receive well data from master communication module 710 that is similar to one or more other pumps (e.g., similar run times, similar maximum run times) and adjust one or more variables based on the variables of the other pumps. In some implementations, computing device 715 may provide an operator with adjusted variables for verification and/or for further adjustment. For example, computing device 710 may determine an adjusted maximum pump run time, provide the adjusted time to an operator, and the operator may confirm the adjusted value and/or further adjust the maximum run time and/or one or more other variables.

FIGS. 6A-6I illustrate aspects of the user interface of the embodiment of the control panel 40 of FIG. 2. The input keys 94 and display 95 are illustrated in each Figure and each Figure contains text generated by controller 50 related to one or more settings of the pump control system 10 as described herein.

Figure 6A:
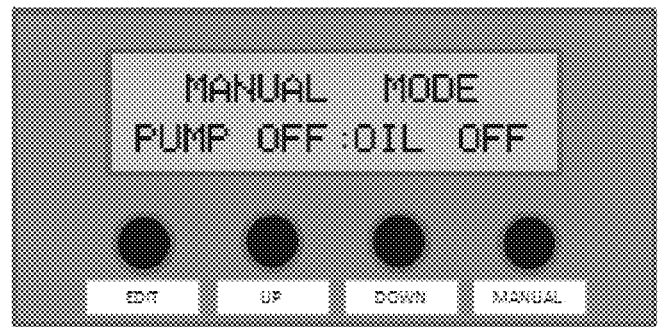
FIG. 6A illustrates the user interface of the embodiment of the control panel of FIG. 2; a manual run screen is illustrated on the display.

In FIG. 6A a manual run screen is illustrated on the display. Pressing the Manual button while on this screen will generate a warning sound via speaker 96, and then start the pump-jack. If the button is released before the reed switch 45 is seen to be on, the Pump-jack will stop. Continuing to hold the Manual button down until the reed switch 45 is seen as on (e.g., when oil if flowing), will cause the system to begin a normal on cycle such as at step 102 of FIG. 4.

Figure 6B:
FIG. 6B illustrates the user interface of the embodiment of the control panel of FIG. 2; a set run time screen is illustrated on the display.

In FIG. 6B a set run time screen is illustrated on the display. This screen is utilized to set the Pump Run Time. Once this screen is displayed, pressing the Edit button will cause the system to enter Edit mode. Once this mode is active, the Up/Down keys can be used to modify the Pump Run Time value. Once editing is complete, pressing the Edit button again will exit Edit Mode and save the value to memory associated with controller 50.

Figure 6C:
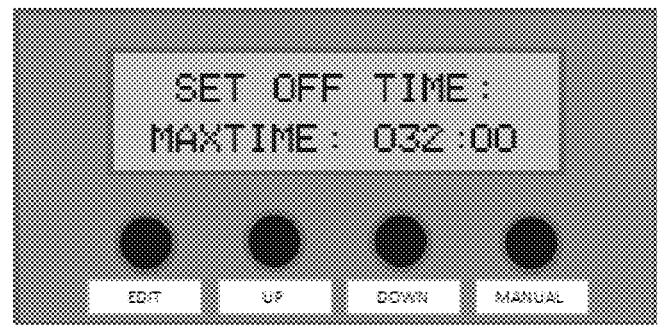
FIG. 6C illustrates the user interface of the embodiment of the control panel of FIG. 2; a set off time screen is illustrated on the display.

In FIG. 6C a set off time screen is illustrated on the display. This screen is utilized to set the duration of the Off Cycle. Once this screen is displayed, pressing the Edit button will cause the system to enter Edit mode. Once this mode is active, the Up/Down keys can be used to modify the value of the Off Cycle duration. Once editing is complete, pressing the Edit button again will exit Edit Mode and save the value to memory associated with controller 50. In certain implementations of automated control described herein, the Off Cycle may thereafter be automatically increased and/or decreased during the automated control.

Figure 6D:
FIG. 6D illustrates the user interface of the embodiment of the control panel of FIG. 2; a set oil watchdog timer screen is illustrated on the display.

In FIG. 6D a set oil watchdog timer screen is illustrated on the display. This screen is utilized to set the Watch-Dog Time Out period. Once this screen is displayed, pressing the Edit button will cause the system to enter Edit mode. Once this mode is active, the up/down keys can be used to modify the Watch-Dog Time Out value. Once editing is complete, pressing the Edit button again will exit Edit Mode and save the value to memory associated with controller 50.

Figure 6E:
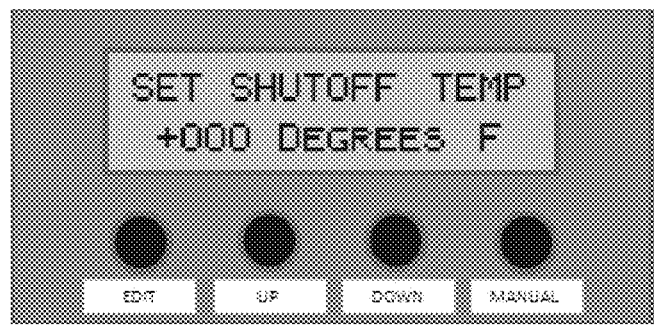
FIG. 6E illustrates the user interface of the embodiment of the control panel of FIG. 2; a set shutoff temperature screen is illustrated on the display.

In FIG. 6E a set shutoff temperature screen is illustrated on the display. This screen is utilized to set the pump-jack Temperature Shut-Off. For example, the set Temperature Shut-Off may be the minimum ambient temperature measured by temperature sensor 61 at which the pump-jack should operate. Once this screen is displayed, pressing the Edit button will cause the system to enter Edit mode. Once this mode is active, the Up/Down keys can be used to modify the temperature value. Once editing is complete, pressing the Edit button again will exit Edit Mode and save the value to memory associated with controller 50.

Figure 6F:
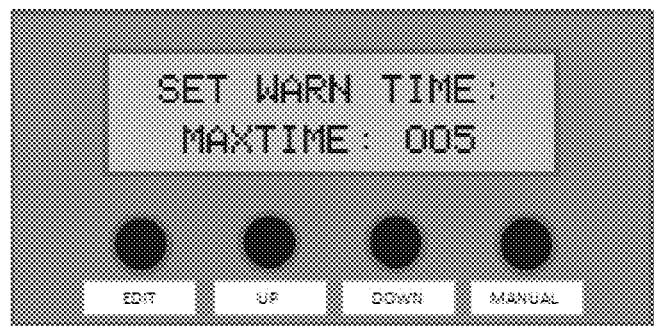
FIG. 6F illustrates the user interface of the embodiment of the control panel of FIG. 2; a set warning time screen is illustrated on the display.

In FIG. 6F a set warning time screen is illustrated on the display. This screen is used to set the pump-jack Start-Up Warning Time. The Start-Up Warning Time is the amount of time before the pump-jack starts that the speaker 96 will provide an audible alert. Once this screen is displayed, pressing the Edit button will cause the system to enter Edit mode. Once this mode is active, the Up/Down keys can be used to modify the start-up warning time value. Once editing is complete, pressing the Edit button again will exit Edit Mode and save the value to memory associated with controller 50.

Figure 6G:
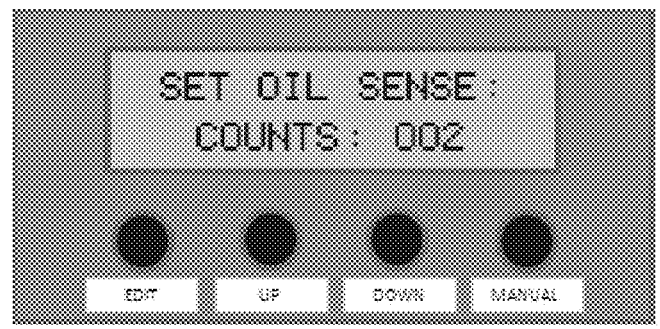
FIG. 6G illustrates the user interface of the embodiment of the control panel of FIG. 2; an oil sensor sensitivity screen is illustrated on the display.

In FIG. 6G an oil sensor sensitivity screen is illustrated on the display. The oil sensor sensitivity screen may be utilized to adjust the trigger level of the reed switch 45 (or other sensor utilized to detect oil flow). The flow rate and volume of pump-jacks can vary substantially and this setting may enable the operator to modify the oil sensor sensitivity to provide for shut down and/or startup of the pump-jack under desired conditions. In the embodiment of FIGS. 1A and 1B, such modification may be in addition to or alternative to adjustment of screw 44. The oil sensor sensitivity value may be edited in a similar manner as described herein with other values and the edited value stored to memory associated with controller 50.

Figure 6H:
FIG. 6H illustrates the user interface of the embodiment of the control panel of FIG. 2; a set maximum oil pressure screen is illustrated on the display.

In FIG. 6H a maximum oil pressure screen is illustrated on the display. The screen displays the current line pressure sensed by a pressure sensor (e.g., a sensor in addition to or in lieu of pressure sensor 47). The screen also enables a maximum oil pressure setting to be dictated. If the maximum oil pressure setting is achieved, the pump-jack may be deactivated to prevent a line burst from excessive pressure.

The maximum pressure value may be edited in a similar manner as described herein with other values and the edited value stored to memory associated with controller 50.

Figure 6I:
FIG. 6I illustrates the user interface of the embodiment of the control panel of FIG. 2; a set minimum oil pressure screen is illustrated on the display.

In FIG. 6I a minimum oil pressure screen is illustrated on the display. The screen displays the current line pressure sensed by a pressure sensor. The screen also enables a minimum oil pressure setting to be dictated. If the minimum oil pressure setting is achieved, the pump-jack may be deactivated to prevent the potential dumping of excessive oil into the environment (e.g., due to a low pressure condition caused by a broken pipe). The minimum pressure value may be edited in a similar manner as described herein with other values and the edited value stored to memory associated with controller 50.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A pump control system, comprising:
   a sensor, said sensor monitoring oil flow in an oil conduit and providing sensor information indicative of said oil flow;
   memory storing instructions;
   a local controller in communication with said sensor and in communication with a pump utilized to draw oil from an oil well, said local controller operable to execute said instructions stored in said memory, wherein said instructions comprise instructions to:
   selectively cause said pump to run for at least a watchdog time out period after an off cycle;

measure an actual pump run time period while said pump is running;

monitor said sensor information from said sensor;

continue to run said pump beyond said watchdog time out period when said sensor information indicates oil is sufficiently flowing in said oil conduit prior to the end of said watchdog time out period;

wherein when said pump runs beyond said watchdog time out period, said instructions allow said pump to run until at least one of: said actual pump run time equals a maximum continuous pump run time, and said sensor information indicates oil is no longer sufficiently flowing in said oil conduit; and cause said pump to enter said off cycle when at least one of said actual pump run time period equals said maximum continuous pump run time or said sensor indicates oil is no longer sufficiently flowing in said oil conduit; and a communications module, wherein said communications module wirelessly provides at least one of said run time and said sensor information to a remote controller and wirelessly receives one or more adjusted variables from said remote controller in response to the providing, said adjusted variables altering one or more operational parameters of said pump, wherein said adjusted variables include an adjustment to said watchdog timeout period and said instructions further comprise instructions to:

alter said watchdog timeout period based on said adjustment.

2. The system of claim 1, wherein said sensor is a pressure sensor, said pressure sensor monitoring fluid pressure in said oil conduit.

3. The system of claim 1, wherein said oil conduit comprises a check valve having a check valve throughway, and wherein said system further comprises:

a barrier pivotally arranged in said check valve throughway, said barrier pivoting to a closed position blocking said check valve throughway when a sufficient positive fluid flow is not present in said check valve throughway and pivoting to one of a plurality of open positions when at least said sufficient positive fluid flow is present in said check valve throughway;

a magnet coupled to said barrier within said check valve and pivoting with said barrier, wherein said magnet is in a first position when said barrier is in said closed position and is in a second position when said barrier is in a threshold open position of said open positions;

wherein said sensor comprises a magnet sensor responding to said magnet in at least one of said first position and said second position.

4. The system of claim 1, wherein said local controller is coupled to said oil conduit.

5. A pump control system for automated control of a pump utilized to draw oil from an oil well, comprising:

a sensor, said sensor monitoring oil flow in an oil conduit and providing sensor information indicative of said oil flow;

memory storing instructions; and a controller in communication with said sensor and in communication with said pump, said controller operable to execute said instructions stored in said memory, wherein said instructions comprise instructions to:

provide well information to a remote computing device, said well information including at least one of a duration of an off cycle, a maximum continuous pump run time, a watchdog time out period, and said sensor information;

receive adjusted well information from said remote computing device, said adjusted well information including at least one of an adjusted duration of said off cycle, an adjusted maximum continuous pump run time, and an adjusted watchdog time out period; and operate, in response to receiving said adjusted well information, said pump based on said adjusted well information.

6. The system of claim 5, wherein said well information includes said duration of said off cycle, said maximum continuous pump run time, said watchdog time out period, and said sensor information.

7. The system of claim 5, wherein said adjusted well information includes said adjusted duration of said off cycle, said adjusted maximum continuous pump run time, and said adjusted watchdog time out period.

8. The system of claim 5, wherein said instructions to operate said pump based on said adjusted well information includes instructions to:

selectively cause said pump to run for at least said adjusted watchdog time out period after said adjusted duration of said off cycle;

monitor said sensor and measure an actual pump run time period while said pump is running;

continue to run said pump beyond said adjusted watchdog time out period when said sensor indicates oil is flowing in said conduit prior to the end of said adjusted watchdog time out period;

wherein when said pump runs beyond said adjusted watchdog time out period, said pump is allowed to run for at least said actual pump run time equals said adjusted maximum continuous pump run time or said sensor indicates oil is no longer sufficiently flowing in said conduit;

cause said pump to enter said off cycle when said pump runs beyond said adjusted watchdog time out period and when either said actual pump run time period equals said adjusted maximum continuous pump run time or said sensor information indicates oil is no longer sufficiently flowing in said conduit.

9. The system of claim 8, wherein said controller and said remote computing device are in remote communication via satellite communication.

10. The system of claim 8, wherein said remote computing device is operable to execute second instructions stored in a second memory, said second instructions including instructions to:

identify said duration of said off cycle;

identify said maximum continuous pump run time;

identify said watchdog time out period;

determine a value for said adjusted duration of said off cycle that is greater than the duration of said off cycle when said sensor information does not indicate oil is flowing in said conduit prior to the end of said watchdog time out period; and determine said value for said adjusted duration of said off cycle that is less than said duration of said off cycle when said pump runs beyond said watchdog time out period.

11. The system of claim 10, wherein said adjusted well information is determined based on operator input to said computing device.

12. The system of claim 10, wherein said adjusted well information is determined by said computing device based on historical data from one or more previous oil well runs.

\* \* \* \* \*